United States Patent
Narasimhan

(10) Patent No.: US 10,642,819 B2
(45) Date of Patent: May 5, 2020

(54) AUTOMATE TELLING DATA-RICH STORIES WITHIN ANALYTICS DASHBOARD

(71) Applicant: salesforce.com, inc., San Francisco, CA (US)

(72) Inventor: Anand Bashyam Narasimhan, Skillman, NJ (US)

(73) Assignee: salesforce.com, inc., San Francisco, CA (US)

( * ) Notice: Subject to any disclaimer, the term of this patent is extended or adjusted under 35 U.S.C. 154(b) by 249 days.

(21) Appl. No.: 15/823,787

(22) Filed: Nov. 28, 2017

(65) Prior Publication Data

US 2019/0163774 A1    May 30, 2019

(51) Int. Cl.
  *G06F 16/23*    (2019.01)
  *G06Q 10/06*    (2012.01)
  *G06F 16/248*   (2019.01)

(52) U.S. Cl.
  CPC ............ *G06F 16/23* (2019.01); *G06F 16/248* (2019.01); *G06Q 10/06393* (2013.01)

(58) Field of Classification Search
  CPC .. G06F 16/23; G06F 16/248; G06Q 10/06393
  USPC ........ 707/754, 737; 715/753, 771, 735, 738, 715/736, 733, 737
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Dung K Chau

(74) *Attorney, Agent, or Firm* — Lowenstein Sandler LLP

(57) ABSTRACT

A method for automated filtering within an analytics dashboard includes integrating, by a server and within a user-interface software framework used to develop dynamic web applications, aspects of the analytics dashboard. The server sets a series of filters for a database associated with the analytics dashboard by, for each filter of the series of filters, defining how the filter operates on data within records of the database. The server detects an action through a user interface of the user-interface software framework. Responsive to detecting the action, the server sequentially applies the series of filters to the data within the records of the database according to a sequential order of the series of filters and with a pause between application of each filter. The server displays, within the analytics dashboard, each set of results sequentially in response to application of each respective filter of the series of filters.

23 Claims, 8 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,601,233 B1 * | 7/2003 | Underwood .............. G06F 8/24 717/100 |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,100,195 B1 * | 8/2006 | Underwood ............ G06F 9/451 726/2 |
| 7,340,411 B2 | 3/2008 | Cook |
| 7,620,655 B2 | 11/2009 | Larsson |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0083650 A1 * | 3/2009 | Kennedy ................ G06F 16/25 715/771 |
| 2012/0015342 A1 * | 1/2012 | Baldwin ............... G06F 17/279 434/365 |
| 2013/0024788 A1 * | 1/2013 | Olsen .................... G06Q 10/10 715/753 |
| 2014/0280142 A1 * | 9/2014 | Wasson ............... G06F 16/2465 707/737 |
| 2015/0295779 A1 * | 10/2015 | Ching .................... G06F 16/26 715/733 |
| 2015/0295780 A1 * | 10/2015 | Hsiao .................... H04L 43/022 715/736 |
| 2015/0295796 A1 * | 10/2015 | Hsiao ................. H04L 41/0813 715/738 |
| 2015/0341212 A1 * | 11/2015 | Hsiao .................... G06F 16/26 715/735 |
| 2016/0226944 A1 * | 8/2016 | Hsiao .................... H04L 43/028 |
| 2017/0322971 A1 * | 11/2017 | Seshadri ............. G06F 3/04817 |
| 2018/0032617 A1 * | 2/2018 | Greenberg ........... G06F 16/958 |

* cited by examiner

US 10,642,819 B2

AUTOMATE TELLING DATA-RICH STORIES WITHIN ANALYTICS DASHBOARD

TECHNICAL FIELD

This disclosure relates to the field of analytics dashboards, and in particular to the telling of data-rich stories within an analytics dashboard.

BACKGROUND

To present data such as metrics and key performance indicators (KPIs) of an analytics dashboard within a presentation to an audience, a presenter has historically used one of two methods. A first method includes filtering down to each specific scenario (e.g., set of filters of a database), take a screen shot of each, and then integrate those screen shots into a separate word processed presentation (e.g., using PowerPoint® by Microsoft of Redmond, Wash.). A second method includes navigating manually within the analytics dashboard in real time by selecting various filters (e.g., selecting multiple sales representatives, or selecting month and year in successive actions).

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
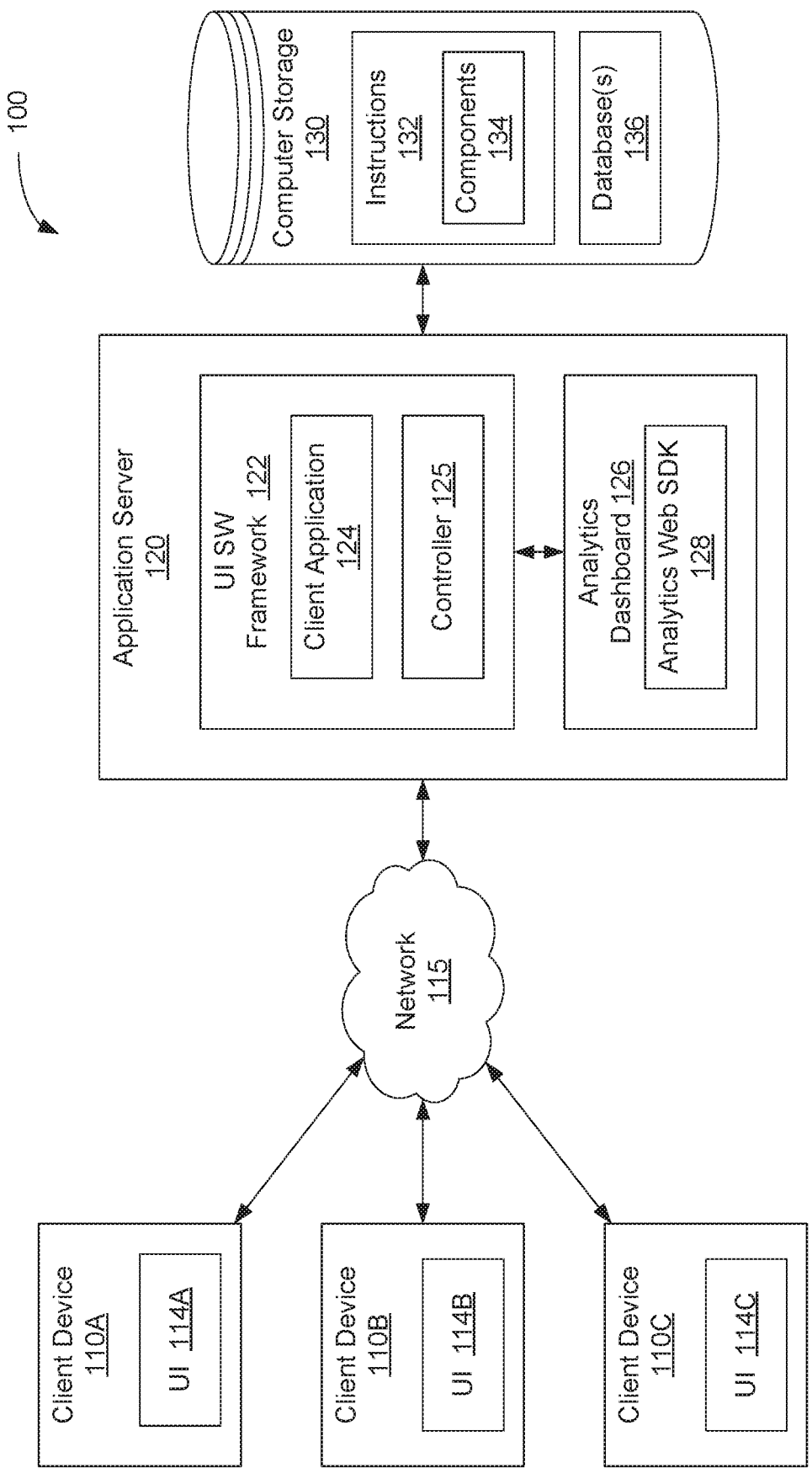
FIG. 1 is a block diagram illustrating a computing environment with an analytics dashboard integrated within a user-interface (UI) software framework for developing dynamic web applications, according to an embodiment.

Embodiments are described for the automating of telling stories through analytics dashboards. The prior methods for describing metrics and KPIs related to representatives or the like tracked within an analytics dashboard are either too time-consuming or are performed manually during a presentation. To manually click through sets of filters to tell a story related to such metrics and KPIs is awkward, slow and requires a presenter for a consistent talk track. This approach puts more focus on the actual filtering down and navigating the analytics dashboard than telling the story and appreciating the metrics and KPIs being accessed.

Accordingly, the present disclosure facilitates an automated approach to telling such stories (using metrics and KPIs of an analytics dashboard) by integrating the analytics dashboard (or at least the data filtering aspects of the analytics dashboard) into a user-interface software framework for developing dynamic web applications. A web or other type of server may perform such integration, in one embodiment, by setting a series of filters for a database associated with the analytics dashboard. For example, for each filter of the series of filters, the server may define how the filter operates on data within records of the database, and such definitions may be provided ahead time by a user that sets up various filters and an order by which they are to be executed.

The server may then retrieve the definition of an action that is to trigger a transition between filters ordered sequentially within the series of filters. The server may apply a first filter of the series of filters to the data within the records of the database in response to detecting the action a first time, and display, within the user interface of the analytics dashboard, a first result in response to application of the first filter to the data. The server may apply a second filter of the series of filters to the data within the records of the database in response to detecting the action a second time, and display, within the user interface of the analytics dashboard, a second result in response to application of the second filter to the data. In this way, a user may step through a pre-programming series of ordered filters without the need of navigating and setting each filter for viewing in a manual fashion.

In an alternative embodiment, the server may detect an action through a user interface of the user-interface software framework that is to trigger playing the entire presentation. For example, responsive to detecting the action, the server sequentially applies the series of filters to the data within the records of the database according to a sequential order of the series of filters, and applying a pause between application of each filter of the series of filters. The server may display, within the analytics dashboard, each set of results sequentially in response to application of each respective filter of the series of filters. Note that each filter that is applied may actually be a combination of filters set up to display multiple metrics or KPIs for any given representative or person. In this way the pause creates a delay in time during which an audience may take in and appreciate each new set of filters for each person or asset being analyzed and/or discussed by way of a presentation.

FIG. 1 is a block diagram illustrating a computing environment 100 with an analytics dashboard integrated within a user-interface software framework for developing dynamic web applications, according to an embodiment. The computing environment 100 may include multiple client devices 110A, 110B, and 110C, each with a respective user interface (UI) 114A, 114B, and 114C that communicate over a network 115 with an application server 120, which in turn is coupled to computer storage 130.

In various embodiments, the application server 120 includes a user-interface (UI) software framework 122 and an analytics dashboard 126. The UI software framework 122 may include a client application 124 (or any other dynamic web applications) and a controller 125. The controller 125 may be hardware, software, firmware, or a combination thereof. The analytics dashboard 126 may be composed of an analytics web software development kit (SDK) 128 or the like, which customers may use to customize the database filtering and UI aspects of the analytics dashboard 126.

The computer storage 130 may store instructions 132, to include multiple software components 134, and one or more databases 136 containing data on which the analytics dashboard 126 operates. The software components 134 may be of a lightweight data-interchange format, e.g., in one embodiment, built on JavaScript® Object Notation (JSON) by Oracle America, Inc. Humans may write in JSON and machines may parse and generate code in JSON. In various languages, this is realized as an object, record, struct, dictionary, hash table, keyed list, or associative array.

In various embodiments, the controller 125 may execute the software components 134 to execute (or act on) payloads from events that are fired (e.g., emitted) by the software components 134. The controller 125 may also create code (e.g. JSON strings or other lightweight data-interchange format code) for payloads that are inserted into new events fired from the software components, which are used for interaction and communication between software components, as will be discussed in more detail.

In the disclosed embodiments, the UI software framework 122 provides a set of tools that software developers may use to develop dynamic web applications. As developers customize or link to several (or many) of the software components 134, these software components 134 may be stored together as (or as a part of) application instructions in the computer storage 130. The computer storage 130 may be distributed and may be cloud-based storage in various embodiments. The UI software framework 122 may facilitate the building of such applications without developers having to write their code, e.g., by visually dragging and dropping the software components 134 and connecting the software components together within a browser or application window. The use of various building environments associated with the UI software framework 122 may facilitate collaboration amongst many developers.

In one embodiment, the UI software framework 122, in executing the customized software components 134, may use a stateful client and stateless server architecture that relies on the lightweight data-interchange format on the client side to manage UI component metadata and application data, e.g., the data within the database(s) 136. The client application, which is executed within a UI of one of the client devices 110A, 110B, or 110C, may call the application server 120 rarely (when necessary), for example, to get more metadata or data. The application server 120 may send data that is needed by the a client device in a way that maximizes efficiency, for example. In one embodiment, JSON is employed to exchange data between the application server 120 and the client devices 110A, 110B, and 110C. The UI software framework 122 may, in this way, intelligently utilize the application server 120, a browser, the client devices 110A, 110B, and 110C, and the network 115 so that developers may focus on the logic and interactions of their applications that are composed of the components 134.

With more particularity, the UI software framework 122 may employ event-driven architecture for better decoupling between the software components 134. For example, each software component may subscribe to an application event, or to a component event that the software component is allowed to detect. The software components 134 may, in this way, be set up for asynchronous processing, e.g., be programmed to execute upon detection of a predetermined action, which may include (but not be limited to) detecting that another software component has executed or been called to execute. These features of the UI software framework 122 also allow the software components to function properly in multiple types of environments, whether on a desktop or a mobile device.

In various embodiments, building an application with the software component 134 facilitates parallel design, improving overall efficiency. The software components 134 may be encapsulated, where the internal code stays private, while the public makeup of each software component may be visible to other software or hardware with which each software component integrates. This separation may give component authors freedom to change the internal implementation details and insulates component consumers from those changes.

With additional particularity, the software components 134 may be self-contained and be reusable units of an application being built within the UI software framework 122. In some examples, multiple software components 134 may be assembled and configured to form a new software component usable in a dynamic web application. Accordingly, a software component 134 may also contain other components, as well as Hypertext Markup Language (HTML), Cascading Style Sheets (CSS), JavaScript®, or other Web-enabled code. This enables a developer to build applications with sophisticated Uniform Resource Locators (URLs). Developers may configure software components 134 by setting the named attributes that the components expose in their definition. Software components 134 may interact with their environment by listening to and/or publishing events.

In various embodiments, event-drive programming may be employed in many software languages, such as JavaScript® and Java Swing™, as just a couple of examples. The code may be used to write handlers that respond to interface events as the interface events occur. A software component 134 may be registered for firing an event in its markup. Events may be fired (e.g., emitted, sent, transmitted) from JavaScript® controller actions that are typically triggered by a user interacting with a user interface. There are two main types of events, component events and application events. Component events may be handled by the software component itself or a software component that instantiates or contains the software component. Applicant events may be handled by software components that are listening for the application event. Accordingly, software applications events may adhere to a publish-subscribe model.

In various embodiments, the UI software framework 122 may leverage the software components 134 to animate and interact with the data in records of the database(s) 136 by way of integrating within aspects of the analytics dashboard 126. This may be performed through creation of one or more events that customized software components of the UI software framework 122 can fire or detect, once fired, and that at least some of the code of the analytics dashboard 126 can detect or fire. Such event-aware code may be integrated within the analytics web SDK 128 so that customized analytics dashboards may also detect or fire these particular events.

In embodiments, two of these events may include an update event and a changed event. An update event may be employed to dynamically set one or a combination of filters on the analytics dashboard 126 or interact with the analytics dashboard by dynamically changing the selection of one or more filters. The update event may be a data packet carrying several attributes, including, for example, an asset identifier (ID) of the asset to which to apply the filter(s), a payload, and the asset type (e.g., "dashboard"). The asset may be, for example, a sales representative or other high-level asset that may be the subject of a presentation using the analytics dashboard. More generally, the asset ID may identify a sub-category of the data within the database 136 to which the next filter applies. The payload may be a string of code (e.g., a JSON string in one embodiment) that identifies the datasets, dimensions, and field values related to records of the database(s) 136, which may be identified in any given filter. Note that each filter may actually apply a combination of filter selections associated with multiple record categories of the database(s) 136.

The changed event may be fired by the analytics dashboard 126 for consumption by the software component 134 of the UI software framework 122. The changed event may acknowledge or confirm the changes to the filter or combination of filters employed by the analytics dashboard 126 on the records of the database(s) 136, and thus may be referred to more generally as an acknowledgement or an acknowledgement packet. The changed event may be a data packet carrying several attributes, for example, the ID of the analytics dashboard that fired the event and a payload. The payload may contain the selection information, e.g., the name of the step involved when changing the record selection(s), and an array of objects representing the current filter selection(s). Each object in the array may contain one or more attributes based on the filter selection(s). In one embodiment, a stacked array of data from multiple object arrays may be formed to apply a more complicated story of filter applications, e.g., record selections.

In various embodiments, the software components 134 may be used to set up each filter of a series of filters, which are to be applied sequentially by the application server 120. A software component may already be defined, handlers been set, and an associated update event registered in the customer component markup. For example, the controller 125 may execute code of the software component to construct the payload for the update event, e.g., in the example below, the setting of StageName to "Close Won" in the oppty_test dashboard.

```
({
    doInit: function(component, event, helper) {
        component.set('v.filter', '{"oppty_test":
        {"StageName": ["Closed Won"]}}');
    },
    handleSendFilter: function(component, event, helper) {
        var filter = component.get('v.filter');
        var dashboardId = component.get('v.dashboardId');
        var evt = $A.get('e.wave:update');
            evt.setParams ({
                id: dashboardId,
                value: filter,
                type: "dashboard"
            }); evt.fire( );
        }
})
```

Furthermore, a software component may have already been defined and everything registered to be able to react to a selection, e.g., detect a change in selection and fire a changed event. The below code exemplifies how the controller may receive and iterate through the payload of a changed event. The payload in this example is an array of objects representing the current filter selection.

```
({
    handleselectionChanged: function(component, event, helper) {
        var params = event.getParams( );
        var payload = params.payload;
        if (payload) {
            var step = payload.step;
            var data = payload.data;
            data.forEach(function(obj) {
                for (var k in obj) {
                    if (k === 'Id') {
                        component.set("v.recordId", obj[k]);
                    }
                }
            });
        }
    }
})
```

In some embodiments, payload data contains other objects, each in turn containing key-value pairs. For example, in addition to the identifier, the objects may also include the noun (for example, "dashboard") and the verb (for example, "selection").

Figure 2:
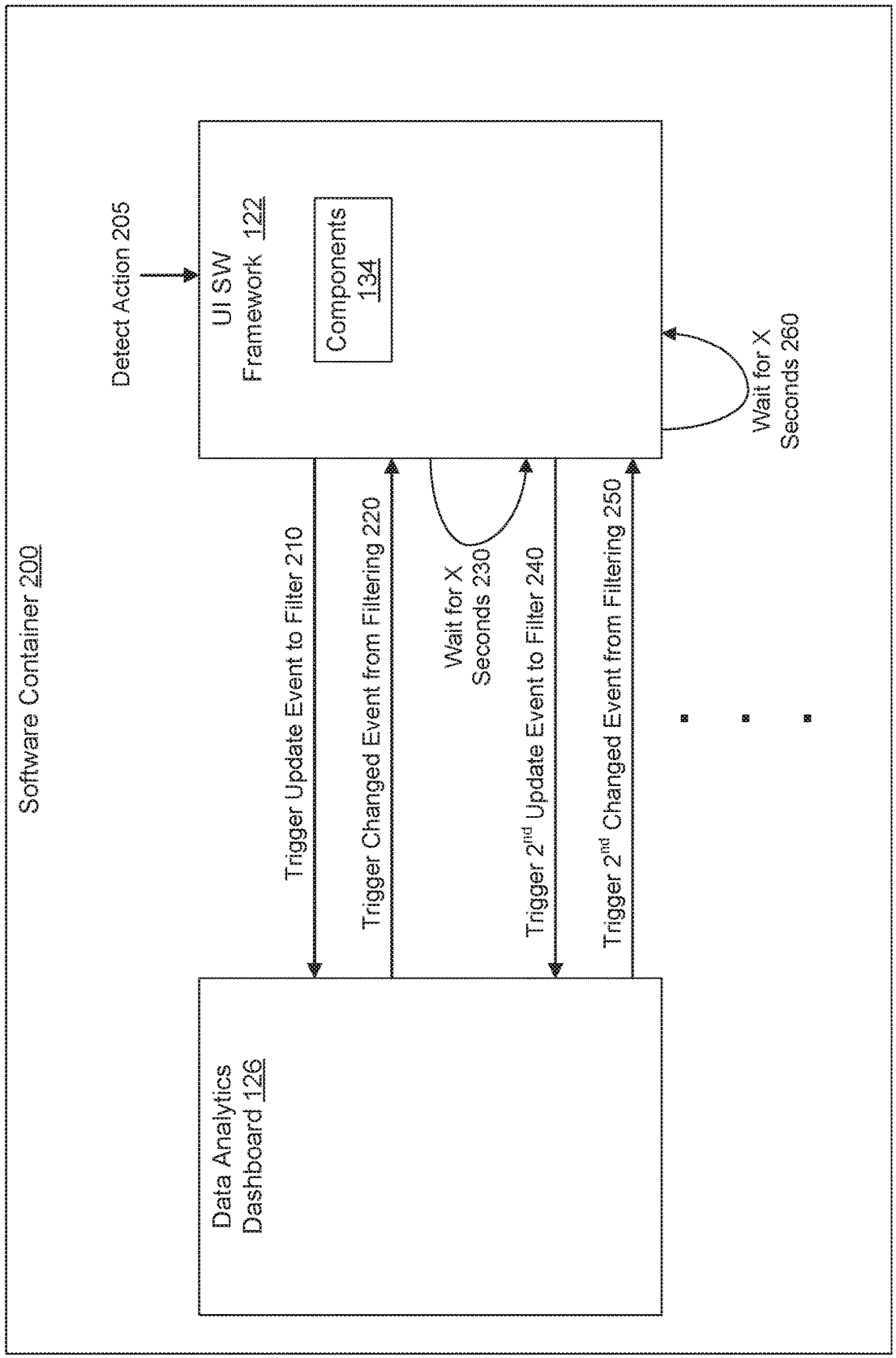
FIG. 2 is a block diagram illustrating a software container (such as a web browser) in which an analytics dashboard presentation may be automated, according to various embodiments.

FIG. 2 is a block diagram illustrating a software container 200 (such as a web browser or application window) in which an analytics dashboard presentation may be automated, according to various embodiments. An analytics dashboard-based presentation may begin with the UI software framework 122 detecting an action that was previously defined to begin sending update events for filtering within the analytics dashboard 126 (205). For example, the action may be a click of a mouse, selection of a key of a keyboard, or receipt of a selection input from an input device within an interface of the UI software framework 122, e.g., in one example, to select "Start Story" or some similarly identified button or presentation start indicated within the user interface.

In response to the action, the UI software framework 122 may trigger an update event to the analytics dashboard 126 to execute a first one or more filter(s) (210). The analytics dashboard 126 may then apply the first one or more filter(s), which causes a display of results in the analytics dashboard. The analytics dashboard 126 may then, in response to application of the first filter, trigger a changed event to acknowledge the application of the first one or more filters (220). Upon receipt of the changed event, the UI software framework 122 may execute a delay poller to cause the presentation to wait for a certain amount of time, e.g., a few seconds or longer (230).

This time delay or pause allows a presentation audience to absorb, think about, and maybe even discuss the data presented during application of the current set of filters. Each set of filters, for example, may tell a story through various themes or similar metrics or KPIs for different sales reps, personnel, or other assets. In one embodiment, the story walks through poorest performing sales people or recruiters, for example, or may walk through the strongest or best performing sales people or recruiters. Each asset may be named, and may be associated with a month filter, a regional filter, product filters, or a combination of such filters.

In one embodiment, the delay poller is a software component within the software components 134 that waits for a predetermined time period to expire before allowing the UI software framework 122 to trigger transition to the next application of a filter of a series of sequential filters. For example, a "poller" is a task or process that periodically checks (e.g., "polls") for a condition being satisfied, such as the availability of new data or the passage of time. In an alternative embodiment, a poller is not used and instead the UI software framework 122 awaits detection of the action subsequent times to trigger transition to a next filter of the series of sequential filters, e.g., as per the method 300 of FIG. 3.

After passage of the time period, the delay poller may trigger the controller 125 to fire a new update event to change the filtering to a second one or more filters (240). The analytics dashboard 126 may then apply the second one or more filter(s), and in response to such application, trigger a second changed event to acknowledge the application of the second one or more filters (250). Upon receipt of the second changed event, the UI software framework 122 may execute a delay poller to cause the presentation to wait for a certain amount of time, e.g., a few seconds or longer (230). This series of steps may repeat in an automated fashion with the use of update events, changed events, and delay poller as herein described.

Figure 3:
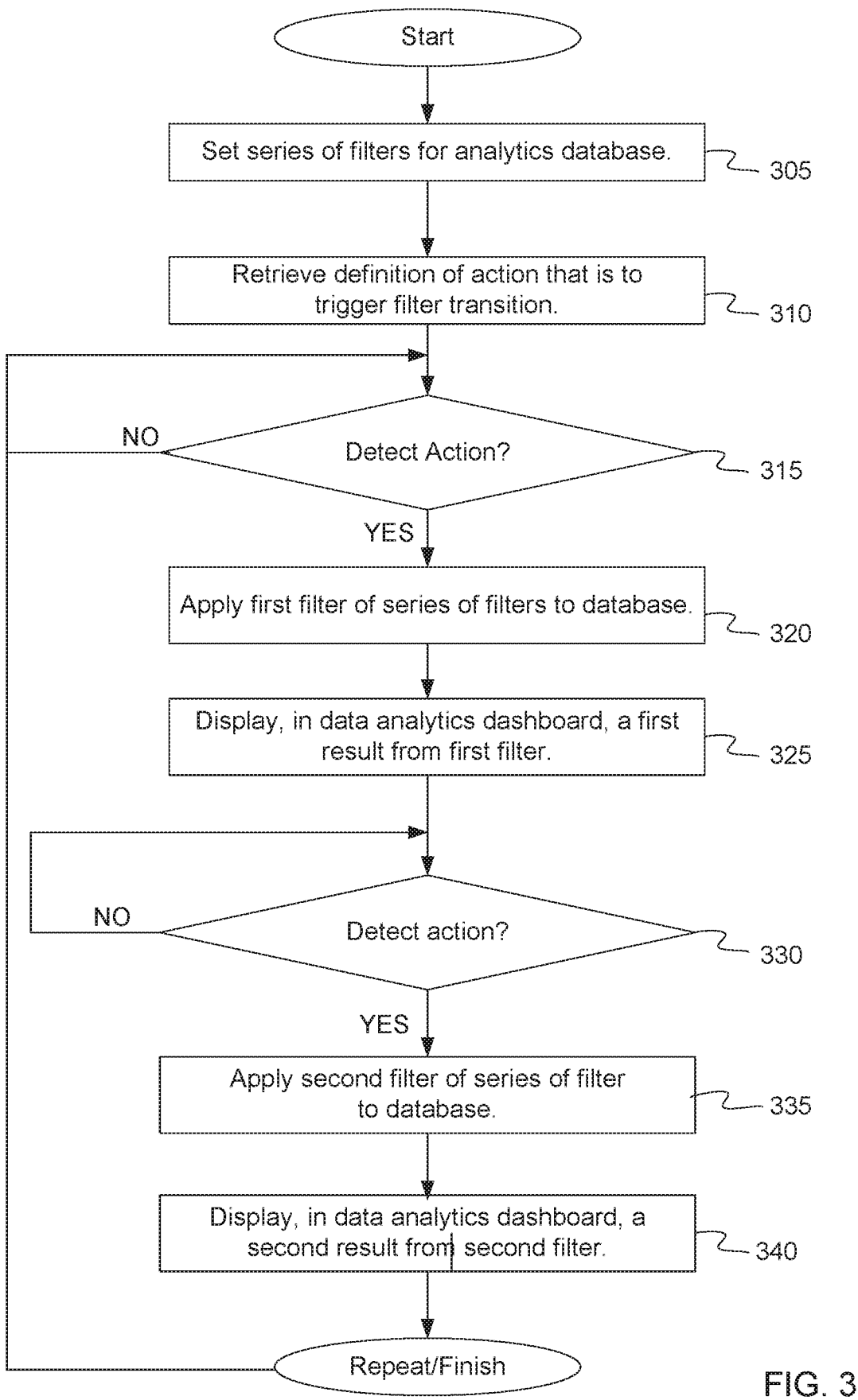
FIG. 3 is a flow diagram illustrating a method for facilitating automated filtering within the UI software framework of FIG. 1 and the container of FIG. 2, according to an embodiment.

FIG. 3 is a flow diagram illustrating a method 300 for automated filtering within the UI software framework 122 of FIG. 1 and the container 200 of FIG. 2, according to an embodiment. The method 300 may be performed by processing logic that comprises hardware (e.g., circuitry, dedicated logic, programmable logic, microcode, etc.), software (e.g., instructions run on a processor to perform hardware simulation), firmware, or a combination thereof. The processing logic may be configured to process data classified with the same capability type. In one implementation, the method 300 may be performed by one of the client devices 110A, 110B, 110C or by the application server 120, as shown in FIG. 1, or by a system or device described in FIGS. 5A-5B, 6A-6B, and 7.

With further reference to FIG. 3, the method 300 may begin with the processing logic setting a series of filters for a database associated with the analytics dashboard 126 by, for each filter of the series of filters, defining how the filter operates on data within records of the database (305). The method 300 may continue with the processing logic retrieving definition of an action that is to trigger a transition between filters ordered sequentially within the series of filters (310).

The method 300 may continue with the processing logic determining whether the action has been detected (315). If not detected, the method 300 may continue with the processing logic continuing to wait. Otherwise, the method 300 may continue with the processing logic applying a first filter of the series of filters to the data within the records of the database in response to detecting the action a first time (320). The method 300 may continue with the processing logic displaying, within the user interface of the analytics dashboard, a first result in response to application of the first filter to the data (325).

The method 300 may continue with the processing logic determining whether the action has been detected a second time (330). If not detected, the method 300 may continue with the processing logic continuing to wait to detect the action. Otherwise, the method 300 may continue with the processing logic applying a second filter of the series of filters to the data within the records of the database in response to detecting the action a second time (335). Application of the second filter may be performed after application of the first filter as the second filter may be ordered sequentially after the first filter with the pre-programmed series of filters for the presentation. Note also that when reference is made to "filter" should be understood to likewise refer to a combination of filters to be applied at the same time. The method 300 may continue with the processing device displaying, within the user interface of the analytics dashboard, a second result in response to application of the second filter to the data (340).

With continued reference to FIG. 3, this set of functions, including detecting the action, applying a next filter that is ordered sequentially after the previous filter, and displaying the search results in the analytics dashboard may allow a presenter to run through a presentation with a mere click of a mouse or a key on a keyboard (or other input from an input device such as a pointer). In addition, such a sequence can also allow for presenters to pause such a sequence for additional explanation as well as include additional media elements (text, video, audio) that can further enhance the overall presentation, story, or talk track. This automated process for presenting metrics and KPIs from an analytics dashboard may obviate the need to manually browse within the analytics dashboard, setting filters manually, and executing the filters manually until manually-selected metrics and KPIs are displayed.

Figure 4:
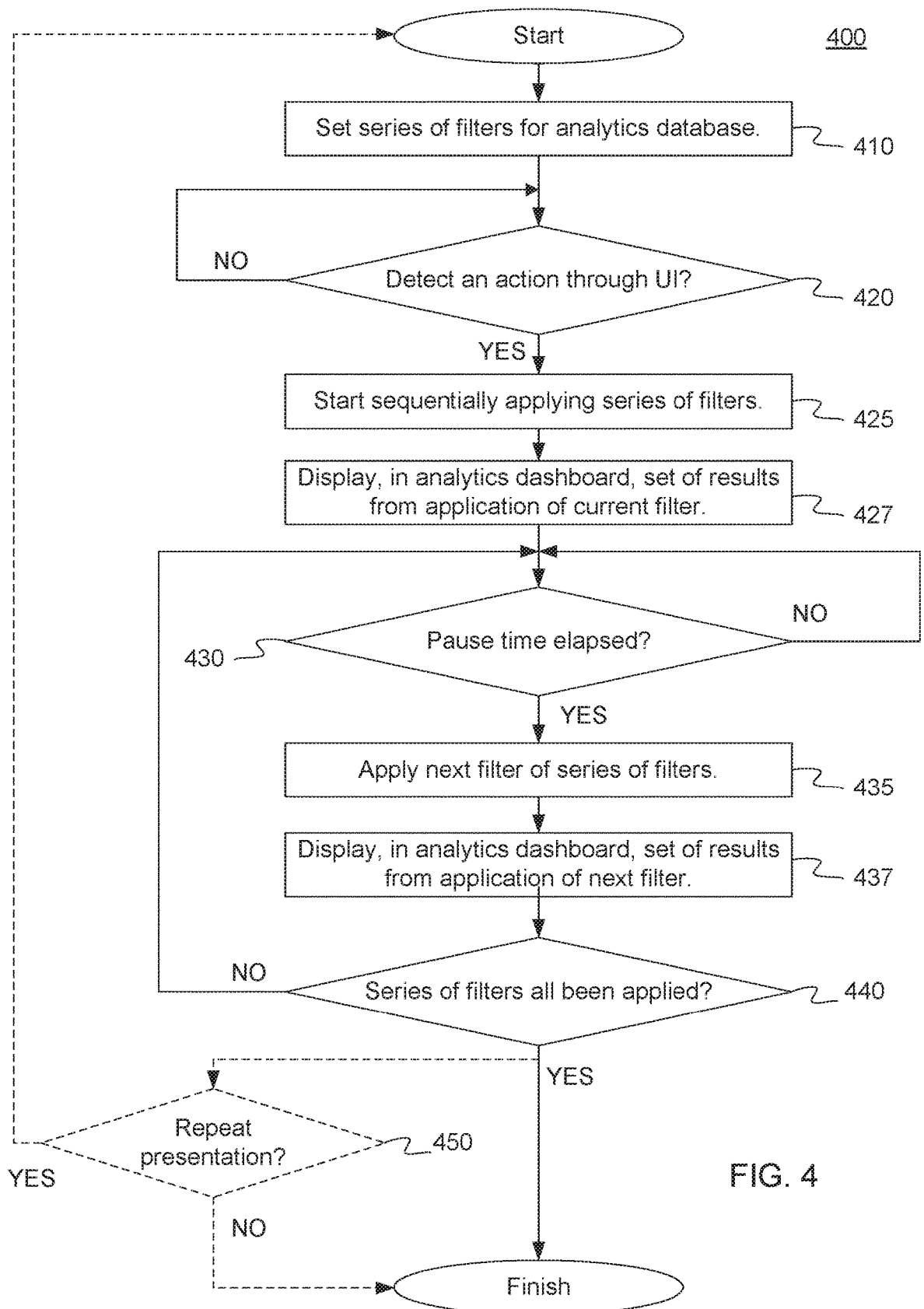
FIG. 4 is a flow diagram illustrating a method for facilitating automated filtering within the UI software framework of FIG. 1 and the container of FIG. 2, according to another embodiment.

FIG. 4 is a flow diagram illustrating a method 400 for automated filtering within the UI software framework 122 of FIG. 1 and the container of FIG. 2, according to another embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic may be configured to process data classified with the same capability type. In one implementation, the method 400 may be performed by one of the client devices 110A, 110B, 110C or by the application server 120, as shown in FIG. 1, or by a system or device described in FIGS. 5A-5B, 6A-6B, and 7.

With reference to FIG. 4, the method 400 may begin with the processing logic setting a series of filters for a database associated with the analytics dashboard 126 by, for each filter of the series of filters, defining how the filter operates on data within records of the database (410). The method 400 may continue with the processing logic determining whether an action has been detected through the UI software framework 122 (420). The action may be, for example, a click of a mouse, selection of a key of a keyboard, or receipt of a selection input from an input device. If there has been no detection, the method 400 may continue with the processing logic waiting for such detection. If there has been detection of the action, the method 400 may continue with the processing logic, responsive to detecting the action, sequentially applying the series of filters to the data within the records of the database according to a sequential order of the series of filters, starting with the first filter (425). The method 400 may continue with displaying a set of results in response to application of the current (e.g., first) filter (427).

The method 400 may continue with the processing logic (e.g., through the delay poller) determining whether a time period for pause has elapsed (430). If not, the delay poller may continue polling until the period of time has elapsed. Once the time period has elapsed, the method 400 may continue with the processing logic applying the next filter of the sequential series filters to data within the records of the database (435). The method 400 may continue with displaying a set of results in response to application of the next (e.g., second) filter (437).

The method 400 may continue with the processing logic determining whether each filter in the series of filters has been applied in the sequential order (440). If not yet, the method 400 may loop back to block 430 with the delay poller applying the pause in the presentation again before applying still the next filter in the sequential series of filters (435), and displaying the results in the analytics dashboard for that next filter (437). Once each filter in the series of filters has been applied (at block 440), the method may finish or may determine whether a repeat has been programmed into the presentation (450). If the answer is the latter is yes, the method 400 may start over again with the same or a different pre-programmed set of filters.

The following description is of one example of a system in which the features described above may be implemented. The components of the system described below are merely one example and should not be construed as limiting. The features described above with respect to FIGS. 1-4 may be implemented in any other type of computing environment, such as one with multiple servers, one with a single server, a multi-tenant server environment, a single-tenant server environment, cloud based or on premise applications or some combination of the above.

Figure 5A:
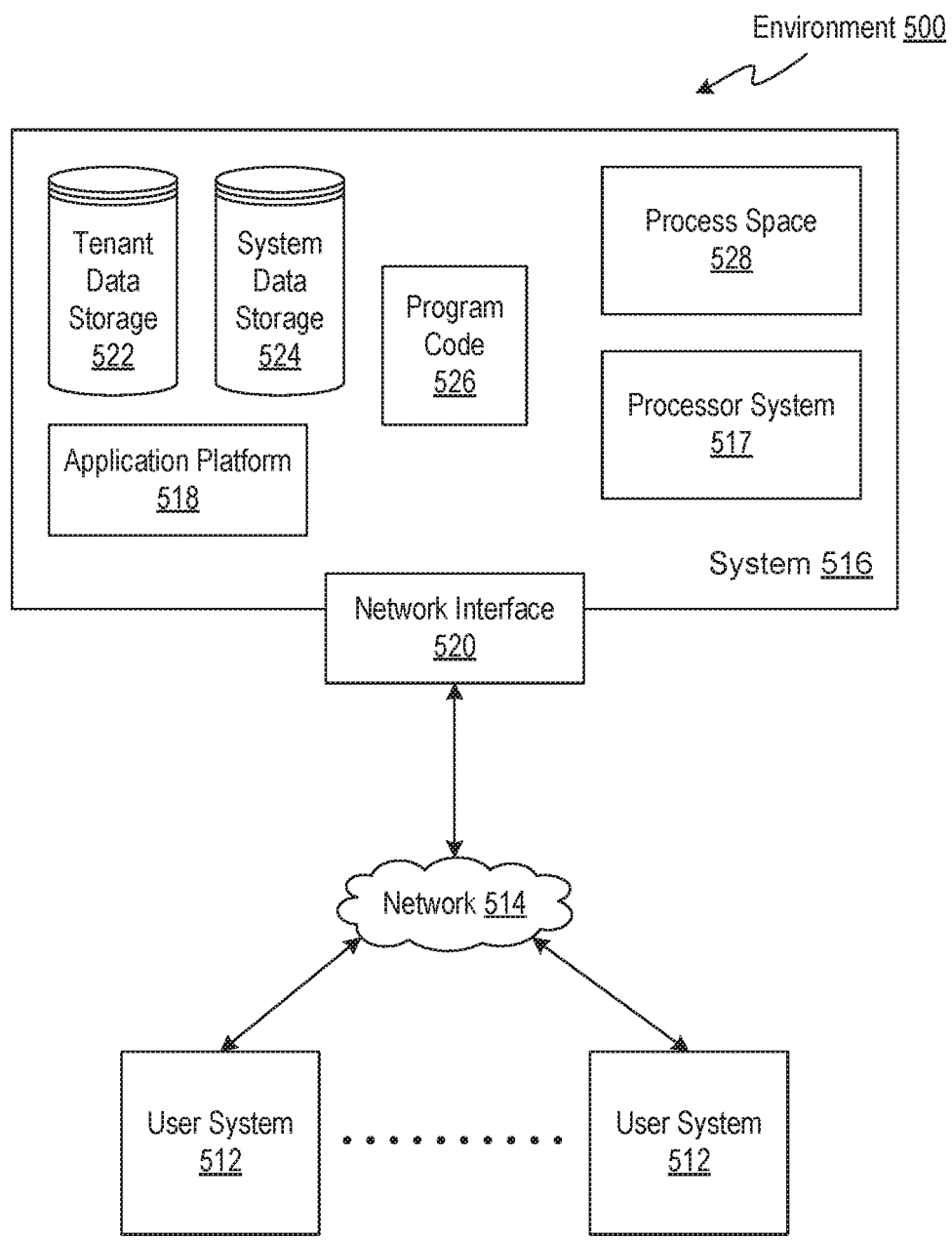
FIG. 5A shows a block diagram of an example environment in which an on-demand database service can be used in accordance with some embodiments.

FIG. 5A shows a block diagram of an example of an environment 500 in which an on-demand database service can be used in accordance with some implementations. The environment 500 includes user systems 512, a network 514, a database system 516 (also referred to herein as a "cloud-based system"), a processor system 517, an application platform 518, a network interface 520, tenant database 522 for storing tenant data 523 (FIG. 5B), system database 524 for storing system data 525 (FIG. 5B), program code 526 for implementing various functions of the system 516, and process space 528 for executing database system processes and tenant-specific processes, such as running applications as part of an application hosting service. In some other implementations, environment 500 may not have all of these components or systems, or may have other components or systems instead of, or in addition to, those listed above.

In some implementations, the environment 500 is an environment in which an on-demand database service exists. An on-demand database service, such as that which can be implemented using the system 516, is a service that is made available to users outside of the enterprise(s) that own, maintain or provide access to the system 516. As described above, such users generally do not need to be concerned with building or maintaining the system 516. Instead, resources provided by the system 516 may be available for such users' use when the users need services provided by the system 516; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 518 can be a framework that allows the applications of system 516 to execute, such as the hardware or software infrastructure of the system 516. In some implementations, the application platform 518 enables the creation, management and execution of one or more applications developed by the provider of the on-demand database service, users accessing the on-demand database service via user systems 512, or third party application developers accessing the on-demand database service via user systems 512.

In some implementations, the system 16 implements a web-based customer relationship management (CRM) system. For example, in some such implementations, the system 516 includes application servers configured to implement and execute CRM software applications as well as provide related data, code, forms, renderable web pages and documents and other information to and from user systems 512 and to store to, and retrieve from, a database system related data, objects, and Web page content. In some MTS implementations, data for multiple tenants may be stored in the same physical database object in tenant database 522. In some such implementations, tenant data is arranged in the storage medium(s) of tenant database 522 so that data of one tenant is kept logically separate from that of other tenants so that one tenant does not have access to another tenant's data, unless such data is expressly shared. The system 16 also implements applications other than, or in addition to, a CRM application. For example, the system 516 can provide tenant access to multiple hosted (standard and custom) applications, including a CRM application. User (or third party developer) applications, which may or may not include CRM, may be supported by the application platform 518. The application platform 518 manages the creation and storage of the applications into one or more database objects and the execution of the applications in one or more virtual machines in the process space of the system 516.

According to some implementations, each system 516 is configured to provide web pages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 514 can be or include any network or combination of networks of systems or devices that communicate with one another. For example, the network 514 can be or include any one or any combination of a LAN (local area network), WAN (wide area network), telephone network, wireless network, cellular network, point-to-point network, star network, token ring network, hub network, or other appropriate configuration. The network 514 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 512 can communicate with system 516 using TCP/IP and, at a higher network level, other common Internet protocols to communicate, such as HTTP, FTP, AFS, WAP, etc. In an example where HTTP is used, each user system 512 can include an HTTP client commonly referred to as a "web browser" or simply a "browser" for sending and receiving HTTP signals to and from an HTTP server of the system 516. Such an HTTP server can be implemented as the sole network interface 520 between the system 516 and the network 514, but other techniques can be used in addition to or instead of these techniques. In some implementations, the network interface 520 between the system 516 and the network 514 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 512 can be implemented as any computing device(s) or other data processing apparatus or systems usable by users to access the database system 16. For example, any of user systems 512 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 512 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 516) of the user system 512 to access, process and view information, pages and applications available to it from the system 16 over the network 514.

Each user system 512 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 512 in conjunction with pages, forms, applications and other information provided by the system 516 or other systems or servers. For example, the 516, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 512 may differ in their respective capacities, and the capacity of a particular user system 512 can be entirely determined by permissions (permission levels) for the current user of such user system. For example, where a salesperson is using a particular user system 512 to interact with the system 516, that user system can have the capacities allotted to the salesperson. However, while an administrator is using that user system 512 to interact with the system 516, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 512 and some or all of its components are operator-configurable using applications, such as a browser, including computer code executed using a central processing unit (CPU) such as an Intel Pentium® processor or the like. Similarly, the system 516 (and additional instances of an MTS, where more than one is present) and all of its components can be operator-configurable using application(s) including computer code to run using the processor system 517, which may be implemented to include a CPU, which may include an Intel Pentium® processor or the like, or multiple CPUs.

The system 516 includes tangible computer-readable media having non-transitory instructions stored thereon/in that are executable by or used to program a server or other computing system (or collection of such servers or computing systems) to perform some of the implementation of processes described herein. For example, computer program code 526 can implement instructions for operating and configuring the system 516 to intercommunicate and to process web pages, applications and other data and media content as described herein. In some implementations, the computer code 526 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 5B:
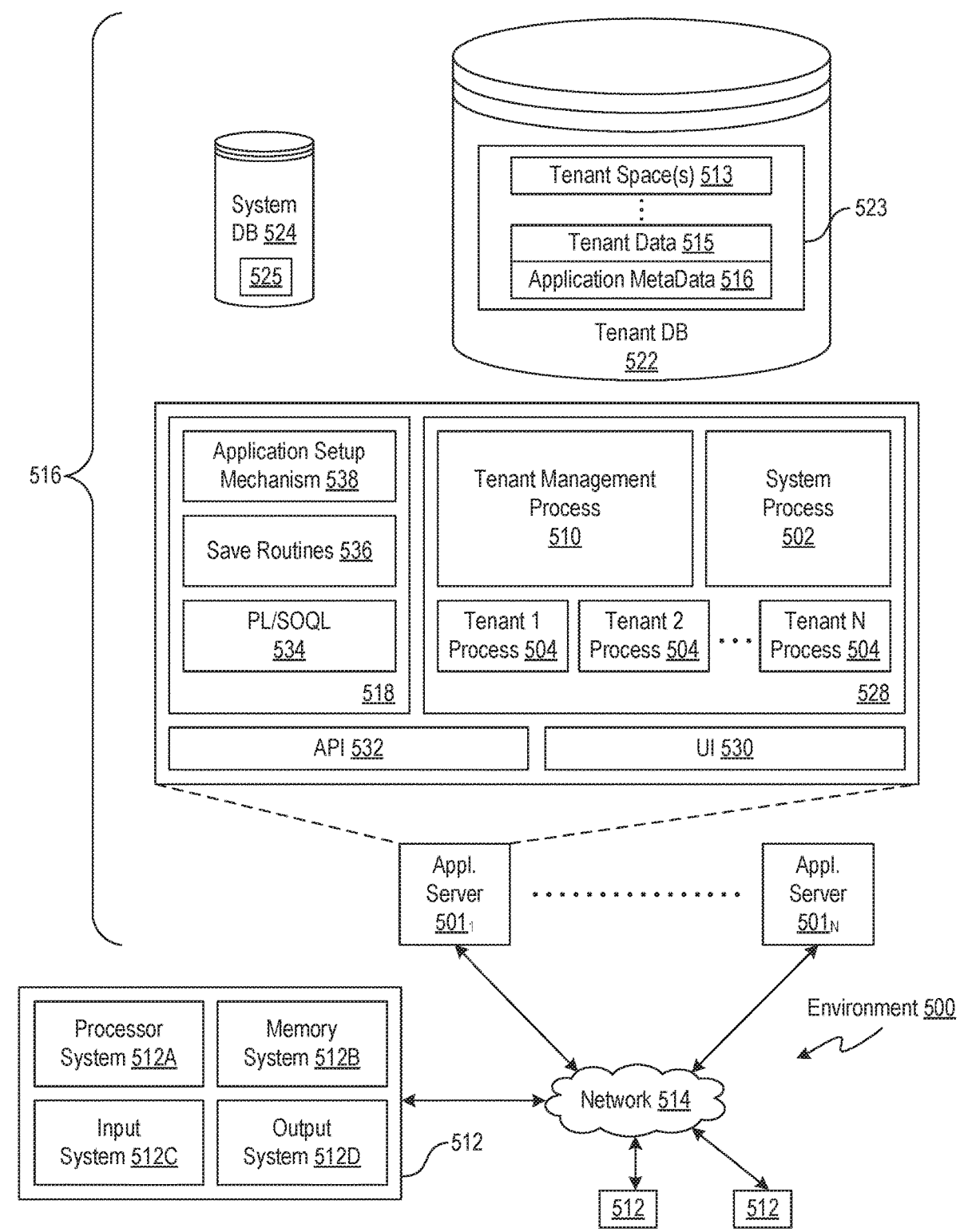
FIG. 5B shows a block diagram of example implementations of elements of FIG. 1A and example interconnections between these elements according to some embodiments.

FIG. 5B shows a block diagram of example implementations of elements of FIG. 5A and example interconnections between these elements according to some implementations. That is, FIG. 5B also illustrates environment 500, but FIG. 5B, various elements of the system 516 and various interconnections between such elements are shown with more specificity according to some more specific implementations. Additionally, in FIG. 5B, the user system 512 includes a processor system 512A, a memory system 512B, an input system 512C, and an output system 512D. The processor system 512A can include a suitable combination of one or more processors. The memory system 512B can include a suitable combination of one or more memory devices. The input system 512C can include a suitable combination of input devices, such as one or more touchscreen interfaces, keyboards, mice, trackballs, scanners, cameras, or interfaces to networks. The output system 512D can include a suitable combination of output devices, such as one or more display devices, printers, or interfaces to networks.

Figure 6A:
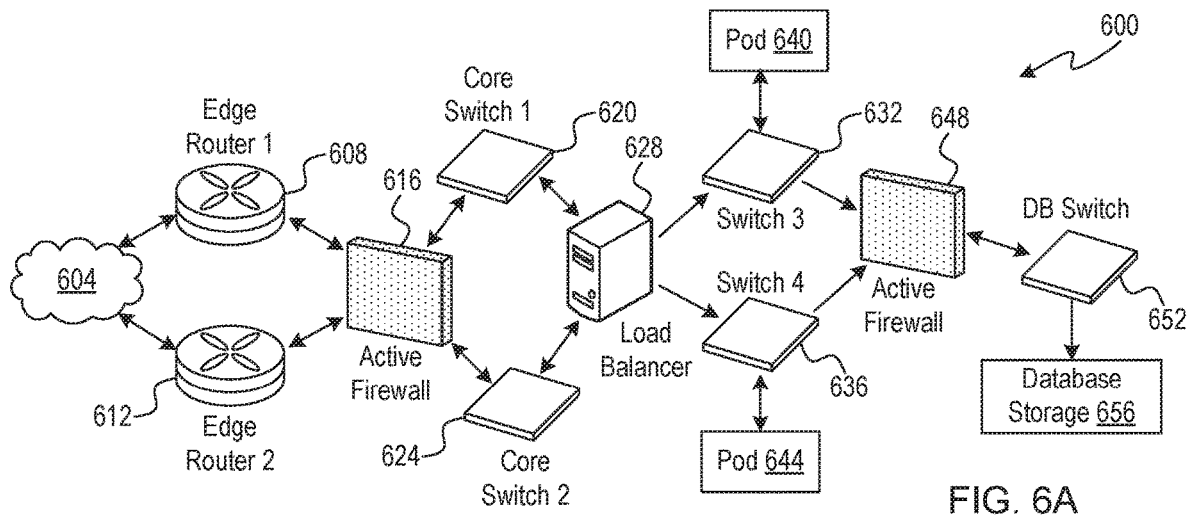
FIG. 6A shows a system diagram of example architectural components of an on-demand database service environment according to some embodiments.
Figure 6B:
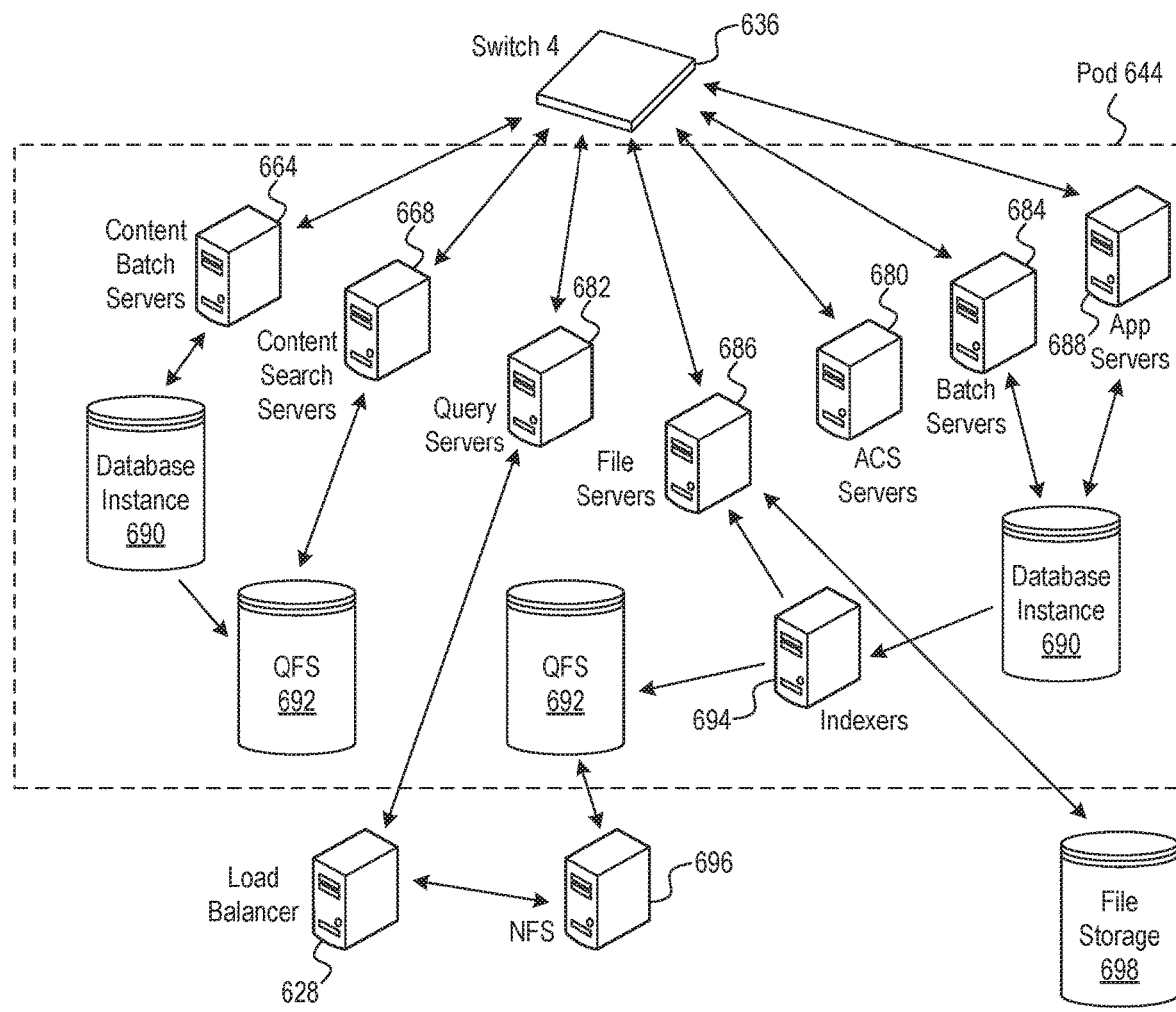
FIG. 6B shows a system diagram further illustrating example architectural components of an on-demand database service environment according to some embodiments.

In FIG. 6B, the network interface 520 is implemented as a set of HTTP application servers $501_1$-$501_N$. Each application server 501, e.g. "app server," is configured to communicate with tenant database 522 and the tenant data 523 therein, as well as system database 524 and the system data 525 therein, to serve requests received from the user systems 512. The tenant data 523 can be divided into individual tenant storage spaces 513, which can be physically or logically arranged or divided. Within each tenant storage space 513, user storage, e.g., tenant data 515 and application metadata 516 can similarly be allocated for each user. For example, a copy of a user's most recently used (MRU) items can be stored to tenant data 515. Similarly, a copy of MRU items for an entire organization that is a tenant can be stored to tenant storage space 513.

The process space 528 includes system process space 502, individual tenant process spaces 504 and a tenant management process space 510. The application platform 518 includes an application setup mechanism 538 that supports application developers' creation and management of applications. Such applications and others can be saved as metadata into tenant database 522 by save routines 536 for execution by subscribers as one or more tenant process spaces 504 managed by tenant management process 510, for example. Invocations to such applications can be coded using PL/SOQL 534, which provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 516 for the subscriber making the invocation and executing the metadata as an application in a virtual machine.

The system 516 of FIG. 5B also includes a user interface (UI) 530 and an application programming interface (API) 532 to system 16 resident processes to users or developers at user systems 512. In some other implementations, the environment 10 may not have the same elements as those listed above or may have other elements instead of, or in addition to, those listed above.

Each application server 501 can be communicably coupled with tenant database 522 and system database 524, for example, having access to tenant data 523 and system data 525, respectively, via a different network connection. For example, one application server $501_1$ can be coupled via the network 514 (for example, the Internet), another application server $501_{N-1}$ can be coupled via a direct network link, and another application server $501_N$ can be coupled by yet a different network connection. Transfer Control Protocol and Internet Protocol (TCP/IP) are examples of typical protocols that can be used for communicating between application servers 501 and the system 516. However, it will be apparent to one skilled in the art that other transport protocols can be used to optimize the system 516 depending on the network interconnections used.

In some implementations, each application server 501 is configured to handle requests for any user associated with any organization that is a tenant of the system 516. Because it can be desirable to be able to add and remove application servers 801 from the server pool at any time and for various reasons, in some implementations there is no server affinity for a user or organization to a specific application server 501. In some such implementations, an interface system implementing a load balancing function (for example, an F5 Big-IP load balancer) is communicably coupled between the application servers 501 and the user systems 512 to distribute requests to the application servers 501. In one implementation, the load balancer uses a least-connections algorithm to route user requests to the application servers 501. Other examples of load balancing algorithms, such as round robin and observed-response-time, also can be used. For example, in some instances, three consecutive requests from the same user could hit three different application servers 501, and three requests from different users could hit the same application server 501. In this manner, by way of example, system 516 can be a multi-tenant system in which system 516 handles storage of, and access to, different objects, data and applications across disparate users and organizations.

In one example storage use case, one tenant can be a company that employs a sales force where each salesperson uses system 516 to manage aspects of their sales. A user can maintain contact data, leads data, customer follow-up data, performance data, goals and progress data, etc., all applicable to that user's personal sales process (for example, in tenant database 522). In an example of a MTS arrangement, because all of the data and the applications to access, view, modify, report, transmit, calculate, etc., can be maintained and accessed by a user system 512 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 516 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 516 also can maintain system level data usable by multiple tenants or other data. Such system level data can include industry reports, news, postings, and the like that are sharable among tenants.

In some implementations, the user systems 512 (which also can be client systems) communicate with the application servers 501 to request and update system-level and tenant-level data from the system 516. Such requests and updates can involve sending one or more queries to tenant database 522 or system database 524. The system 516 (for example, an application server 501 in the system 516) can automatically generate one or more SQL statements (for example, one or more SQL queries) designed to access the desired information. System database 524 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 6A shows a system diagram illustrating example architectural components of an on-demand database service environment 600 according to some implementations. A client machine communicably connected with the cloud 604, generally referring to one or more networks in combination, as described herein, can communicate with the on-demand database service environment 600 via one or more edge routers 608 and 612. A client machine can be any of the examples of user systems 12 described above. The edge routers can communicate with one or more core switches 620 and 624 through a firewall 616. The core switches can communicate with a load balancer 628, which can distribute server load over different pods, such as the pods 640 and 644. The pods 640 and 644, which can each include one or more servers or other computing resources, can perform data processing and other operations used to provide on-demand services. Communication with the pods can be conducted via pod switches 632 and 636. Components of the on-demand database service environment can communicate with database storage 656 through a database firewall 648 and a database switch 652.

As shown in FIGS. 6A and 6B, accessing an on-demand database service environment can involve communications transmitted among a variety of different hardware or software components. Further, the on-demand database service environment 600 is a simplified representation of an actual on-demand database service environment. For example, while only one or two devices of each type are shown in FIGS. 6A and 6B, some implementations of an on-demand database service environment can include anywhere from one to several devices of each type. Also, the on-demand database service environment need not include each device shown in FIGS. 6A and 6B, or can include additional devices not shown in FIGS. 6A and 6B.

Additionally, it should be appreciated that one or more of the devices in the on-demand database service environment 600 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 604 is intended to refer to a data network or multiple data networks, often including the Internet. Client machines communicably connected with the cloud 604 can communicate with other components of the on-demand database service environment 600 to access services provided by the on-demand database service environment. For example, client machines can access the on-demand database service environment to retrieve, store, edit, or process information. In some implementations, the edge routers 608 and 612 route packets between the cloud 604 and other components of the on-demand database service environment 600. For example, the edge routers 608 and 612 can employ the Border Gateway Protocol (BGP). The BGP is the core routing protocol of the Internet. The edge routers 608 and 612 can maintain a table of IP networks or 'prefixes', which designate network reachability among autonomous systems on the Internet.

In some implementations, the firewall 616 can protect the inner components of the on-demand database service environment 600 from Internet traffic. The firewall 616 can block, permit, or deny access to the inner components of the on-demand database service environment 600 based upon a set of rules and other criteria. The firewall 616 can act as one or more of a packet filter, an application gateway, a stateful filter, a proxy server, or any other type of firewall.

In some implementations, the core switches 620 and 624 are high-capacity switches that transfer packets within the on-demand database service environment 600. The core switches 620 and 624 can be configured as network bridges that quickly route data between different components within the on-demand database service environment. In some implementations, the use of two or more core switches 620 and 624 can provide redundancy or reduced latency.

In some implementations, the pods 640 and 644 perform the core data processing and service functions provided by the on-demand database service environment. Each pod can include various types of hardware or software computing resources. An example of the pod architecture is discussed in greater detail with reference to FIG. 6B. In some implementations, communication between the pods 640 and 644 is conducted via the pod switches 632 and 636. The pod switches 632 and 636 can facilitate communication between the pods 640 and 644 and client machines communicably connected with the cloud 604, for example via core switches 620 and 624. Also, the pod switches 632 and 636 may facilitate communication between the pods 640 and 644 and the database storage 656. In some implementations, the load balancer 628 can distribute workload between the pods 640 and 644. Balancing the on-demand service requests between the pods can assist in improving the use of resources, increasing throughput, reducing response times, or reducing overhead. The load balancer 628 may include multilayer switches to analyze and forward traffic.

In some implementations, access to the database storage 656 is guarded by a database firewall 648. The database firewall 648 can act as a computer application firewall operating at the database application layer of a protocol stack. The database firewall 648 can protect the database storage 656 from application attacks such as structure query language (SQL) injection, database rootkits, and unauthorized information disclosure. In some implementations, the database firewall 648 includes a host using one or more forms of reverse proxy services to proxy traffic before passing it to a gateway router. The database firewall 648 can inspect the contents of database traffic and block certain content or database requests. The database firewall 648 can work on the SQL application level atop the TCP/IP stack, managing applications' connection to the database or SQL management interfaces as well as intercepting and enforcing packets traveling to or from a database network or application interface.

In some implementations, communication with the database storage 656 is conducted via the database switch 652. The multi-tenant database storage 656 can include more than one hardware or software components for handling database queries. Accordingly, the database switch 652 can direct database queries transmitted by other components of the on-demand database service environment (for example, the pods 640 and 644) to the correct components within the database storage 656. In some implementations, the database storage 656 is an on-demand database system shared by many different organizations as described above with reference to FIG. 6A and FIG. 6B.

FIG. 6B shows a system diagram further illustrating example architectural components of an on-demand database service environment according to some implementations. The pod 644 can be used to render services to a user of the on-demand database service environment 600. In some implementations, each pod includes a variety of servers or other systems. The pod 644 includes one or more content batch servers 664, content search servers 668, query servers 682, file force servers 686, access control system (ACS) servers 680, batch servers 684, and app servers 688. The pod 644 also can include database instances 690, quick file systems (QFS) 692, and indexers 694. In some implementations, some or all communication between the servers in the pod 644 can be transmitted via the switch 636.

In some implementations, the app servers 688 include a hardware or software framework dedicated to the execution of procedures (for example, programs, routines, scripts) for supporting the construction of applications provided by the on-demand database service environment 600 via the pod 644. In some implementations, the hardware or software framework of an app server 688 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 664 can handle requests internal to the pod. Some such requests can be long-running or not tied to a particular customer. For example, the content batch servers 664 can handle requests related to log mining, cleanup work, and maintenance tasks. The content search servers 668 can provide query and indexer functions. For example, the functions provided by the content search servers 668 can allow users to search through content stored in the on-demand database service environment. The file force servers 686 can manage requests for information stored in the File force storage 698. The File force storage 698 can store information such as documents, images, and basic large objects (BLOBs). By managing requests for information using the file force servers 686, the image footprint on the database can be reduced. The query servers 682 can be used to retrieve information from one or more file systems. For example, the query system 682 can receive requests for information from the app servers 688 and transmit information queries to the NFS 696 located outside the pod.

The pod 644 can share a database instance 690 configured as a multi-tenant environment in which different organizations share access to the same database. Additionally, services rendered by the pod 644 may call upon various hardware or software resources. In some implementations, the ACS servers 680 control access to data, hardware resources, or software resources. In some implementations, the batch servers 684 process batch jobs, which are used to run tasks at specified times. For example, the batch servers 684 can transmit instructions to other servers, such as the app servers 688, to trigger the batch jobs.

In some implementations, the QFS 692 is an open source file system available from Sun Microsystems® of Santa Clara, Calif. The QFS can serve as a rapid-access file system for storing and accessing information available within the pod 644. The QFS 692 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 668 or indexers 694 to identify, retrieve, move, or update data stored in the network file systems 696 or other storage systems.

In some implementations, one or more query servers 682 communicate with the NFS 696 to retrieve or update information stored outside of the pod 644. The NFS 696 can allow servers located in the pod 644 to access information to access files over a network in a manner similar to how local storage is accessed. In some implementations, queries from the query servers 682 are transmitted to the NFS 696 via the load balancer 628, which can distribute resource requests over various resources available in the on-demand database service environment. The NFS 696 also can communicate with the QFS 692 to update the information stored on the NFS 696 or to provide information to the QFS 692 for use by servers located within the pod 644.

In some implementations, the pod includes one or more database instances 690. The database instance 690 can transmit information to the QFS 692. When information is transmitted to the QFS, it can be available for use by servers within the pod 644 without using an additional database call. In some implementations, database information is transmitted to the indexer 694. Indexer 694 can provide an index of information available in the database 690 or QFS 692. The index information can be provided to file force servers 686 or the QFS 692.

Figure 7:
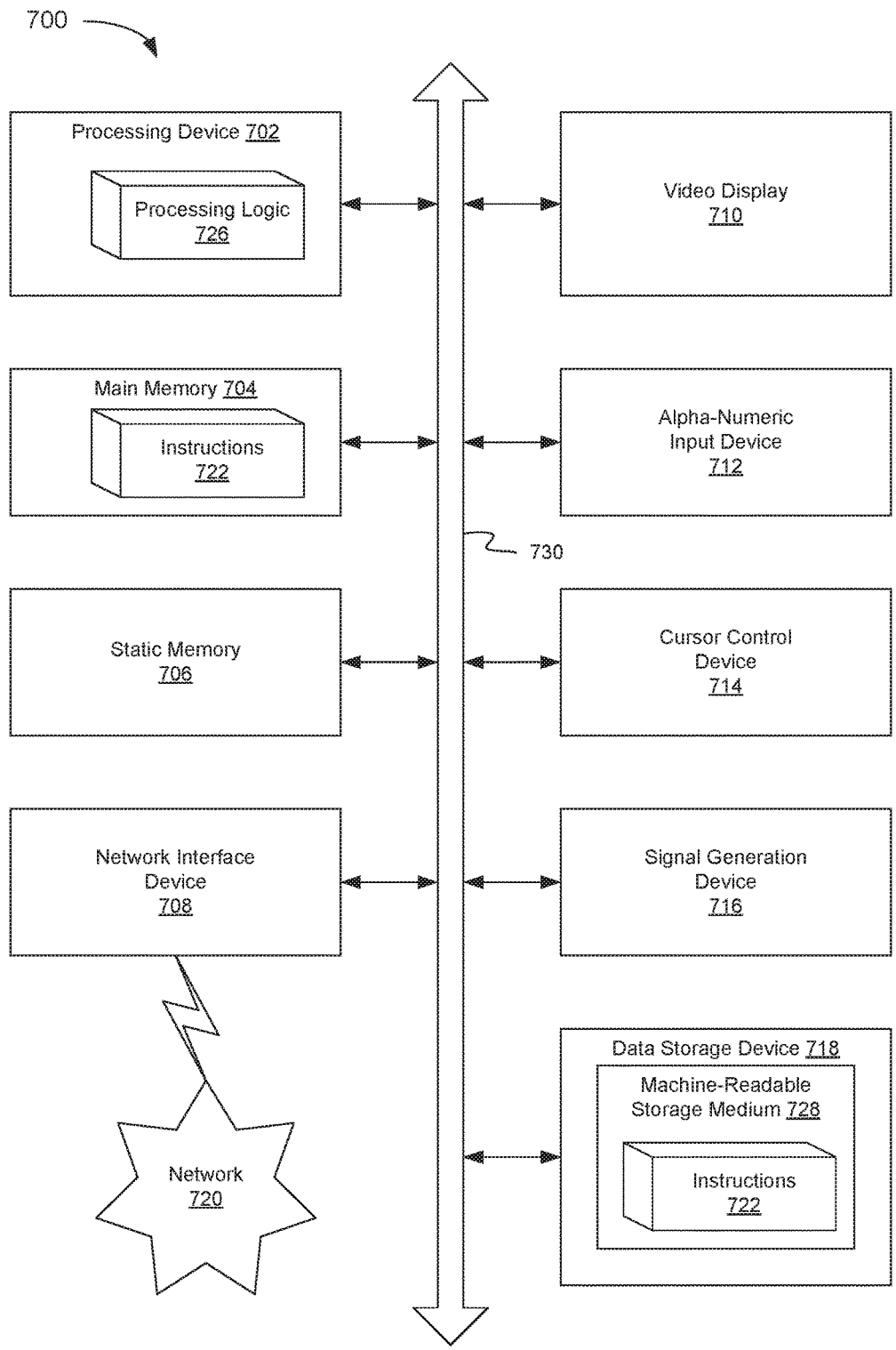
FIG. 7 is a block diagram illustrating an exemplary computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent application server 120, as shown in FIG. 1.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the notification manager 210 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of in-memory buffer service 114) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method for automated filtering within an analytics dashboard, the method comprising integrating, by a server and within a user-interface software framework used to develop dynamic web applications, aspects of the analytics dashboard, wherein integrating comprises the server:
    setting a series of filters for a database associated with the analytics dashboard by, for each filter of the series of filters, defining how the filter operates on data within records of the database;
    retrieving definition of an action that is to trigger a transition between filters ordered sequentially within the series of filters;
    applying a first filter of the series of filters to the data within the records of the database in response to detecting the action a first time;
    displaying, within the user interface of the analytics dashboard, a first result in response to application of the first filter to the data;
    applying a second filter of the series of filters to the data within the records of the database in response to detecting the action a second time; and
    displaying, within the user interface of the analytics dashboard, a second result in response to application of the second filter to the data.

2. The method of claim 1, wherein the action comprises at least one of a click of a mouse, selection of a key of a keyboard, or receipt of a selection input from an input device.

3. The method of claim 1, wherein the second filter sequentially follows the first filter in the series of filters.

4. The method of claim 1, wherein applying the first filter further comprises sending a first data packet to the analytics dashboard, the first data packet including a first event that changes filter selection to the first filter, the method further comprising receiving first acknowledgement of change to application of the first filter to the data.

5. The method of claim 4, wherein the first event includes a first asset identifier and a first payload, the first payload comprising code written in a lightweight data-interchange format and including at least one of datasets, dimensions, or field values related to the records of the database as defined by the first filter, and wherein the first asset identifier identifies a sub-category of the data within the database to which the first filter applies.

6. The method of claim 4, wherein applying the second filter further comprises sending a second data packet to the analytics dashboard, the second data packet including a second event that changes filter selection to the second filter, the method further comprising receiving second acknowledgement of change to application of the second filter to the data.

7. A method for automated filtering within an analytics dashboard, the method comprising integrating, by a server and within a user-interface software framework used to develop dynamic web applications, aspects of the analytics dashboard, wherein integrating comprises the server:
    setting a series of filters for a database associated with the analytics dashboard by, for each filter of the series of filters, defining how the filter operates on data within records of the database;
    detecting an action through a user interface of the user-interface software framework;
    responsive to detecting the action, sequentially applying the series of filters to the data within the records of the database according to a sequential order of the series of filters and with a pause between application of each filter of the series of filters; and
    displaying, within the analytics dashboard, each set of results sequentially in response to application of each respective filter of the series of filters.

8. The method of claim 7, further comprising executing a delay poller to track passage of a period of time equal to the pause, and to trigger transition to a next filter of the series of filters.

9. The method of claim 7, wherein the action comprises at least one of a click of a mouse, selection of a key of a keyboard, or receipt of a selection input from an input device, to start automating filtering by the data analytics dashboard.

10. The method of claim 7, wherein sequentially applying the series of filters comprises, for each filter, sending a data packet to the analytics dashboard, the data packet including an event that changes filter selection to a next filter within the sequential order of the series of filters.

11. The method of claim 10, wherein the event includes a payload, the payload comprising instructions and including at least one of datasets, dimensions, or field values related to the records of the database as defined by the next filter.

12. The method of claim 10, wherein the event includes a first asset identifier, the first asset identifier identifying a sub-category of the data within the database to which the next filter applies.

13. The method of claim 10, wherein each filter of the series of filters comprises a set of filter selections associated with multiple record categories of the database.

14. The method of claim 7, further comprising, for each filter of the series of filters applied to the data, receiving an acknowledgement packet indicating change to filter application, wherein the acknowledgement packet comprises an event having a payload and an identifier of at least one asset within the analytics dashboard associated with the filter.

15. The method of claim 14, wherein the payload comprises an array of objects that represents one or more record selections of the filter.

16. A system comprising:
- a non-transitory computer-readable storage medium to store instructions of a user-interface software framework used to develop dynamic web applications, and to store a database associated with an analytics dashboard; and
- a processor coupled to the non-transitory computer-readable storage medium, the processor to execute the instructions to:
  - program a series of filters for the database, wherein to set each filter of the series of filters, define how the filter operates on data within records of the database;
  - detect an action through a user interface of the user-interface software framework;
  - in response to detection of the action, sequentially apply the series of filters to the data within the records of the database according to a sequential order of the series of filters and with a pause between application of each filter of the series of filters; and
  - display, within the analytics dashboard, each set of results sequentially in response to application of each respective filter of the series of filters.

17. The system of claim 16, wherein the processor is further to execute the instructions to execute a delay poller to track passage of a period of time equal to the pause, and to trigger transition to a next filter of the series of filters.

18. The system of claim 16, further comprising an input device, wherein the action comprises receipt of a selection input, from the input device, to select a presentation start indicia.

19. The system of claim 16, wherein to sequentially apply the series of filters comprises, for each filter, to send a data packet to the analytics dashboard, the data packet including an event that changes filter selection to a next filter within the sequential order of the series of filters.

20. The system of claim 19, wherein the event includes a first asset identifier and a payload, the payload comprising instructions and including at least one of datasets, dimensions, or field values related to the records of the database as defined by the next filter, and wherein the first asset identifier identifies a sub-category of the data within the database to which the next filter applies.

21. The system of claim 19, wherein each filter of the series of filters comprises a set of filter selections associated with multiple record categories of the database.

22. The system of claim 16, wherein the processor is further to execute the instruction to, for each filter of the series of filters applied to the data, receive an acknowledgement packet indicating change to filter application, wherein the acknowledgement packet comprises an event having a payload and an identifier of at least one asset within the analytics dashboard associated with the filter.

23. The system of claim 22, wherein the payload comprises an array of objects that represents one or more record selections of the filter.

* * * * *